(12) United States Patent
Wu

(10) Patent No.: US 10,831,304 B2
(45) Date of Patent: Nov. 10, 2020

(54) CONTROL CHIP FOR CAPACITIVE TOUCH DEVICE WITH HIGH SENSITIVITY AND LOW POWER CONSUMPTION

(71) Applicant: PixArt Imaging Inc., Hsin-Chu County (TW)

(72) Inventor: Sung-Han Wu, Hsin-Chu County (TW)

(73) Assignee: PIXART IMAGING INC., Hsin-Chu County (TW)

( * ) Notice: Subject to any disclaimer, the term of this patent is extended or adjusted under 35 U.S.C. 154(b) by 294 days.

(21) Appl. No.: 15/635,010

(22) Filed: Jun. 27, 2017

(65) Prior Publication Data

US 2017/0300168 A1 Oct. 19, 2017

Related U.S. Application Data

(63) Continuation-in-part of application No. 15/080,718, filed on Mar. 25, 2016, now abandoned.

(30) Foreign Application Priority Data

Mar. 26, 2015 (TW) .............................. 104109783 A

(51) Int. Cl.
*G06F 3/044* (2006.01)
*G06F 3/041* (2006.01)

(52) U.S. Cl.
CPC ............ *G06F 3/0416* (2013.01); *G06F 3/044* (2013.01); *G06F 2203/04106* (2013.01); *G06F 2203/04108* (2013.01)

(58) Field of Classification Search
CPC ....... H03K 17/962; H03K 17/955; G01D 5/24
See application file for complete search history.

(56) References Cited

U.S. PATENT DOCUMENTS

| | | | | |
|---|---|---|---|---|
| 2008/0297487 | A1* | 12/2008 | Hotelling | ............... G06F 1/3203 345/173 |
| 2010/0060610 | A1 | 3/2010 | Wu | |
| 2013/0106759 | A1 | 5/2013 | Fredriksen et al. | |
| 2014/0139242 | A1 | 5/2014 | Lee et al. | |
| 2014/0210491 | A1* | 7/2014 | Jonsson | ............. G01R 27/2605 324/661 |
| 2014/0327644 | A1 | 11/2014 | Mohindra | |
| 2016/0166201 | A1* | 6/2016 | Stein | .................... A61B 5/4851 600/302 |

(Continued)

FOREIGN PATENT DOCUMENTS

TW 201011620 A 3/2010

*Primary Examiner* — William Boddie
*Assistant Examiner* — Jeffrey Parker
(74) *Attorney, Agent, or Firm* — Hauptman Ham, LLP

(57) ABSTRACT

There is provided a capacitive touch device including a touch panel and a control chip. The touch panel includes detection electrodes configured to form self-capacitance and mutual-capacitance. The control chip includes an emulation circuit and a subtraction circuit. The emulation circuit is configured to output a reference signal. The subtraction circuit is coupled to the emulation circuit and the detection electrode, subtracts the reference signal outputted by the emulation circuit from a detected signal outputted by the detection electrodes to output a differential detected signal, and identifies a touch event according to the differential detected signal to reduce the power consumption for touch detection.

17 Claims, 10 Drawing Sheets

(56) References Cited

U.S. PATENT DOCUMENTS

| | | | |
|---|---|---|---|
| 2016/0173089 A1* | 6/2016 | Kao | H03K 17/962 |
| | | | 200/600 |
| 2016/0282991 A1* | 9/2016 | Wu | G06F 3/0416 |
| 2016/0320911 A1 | 11/2016 | Crandall et al. | |
| 2017/0277328 A1 | 9/2017 | Kurasawa et al. | |

* cited by examiner

CONTROL CHIP FOR CAPACITIVE TOUCH DEVICE WITH HIGH SENSITIVITY AND LOW POWER CONSUMPTION

CROSS REFERENCE TO RELATED APPLICATION

This application is a continuation-in-part application of U.S. patent application Ser. No. 15/080,718 filed on Mar. 25, 2016, which claims the priority benefit of Taiwan Patent Application Ser. No. 104109783, filed on Mar. 26, 2015, the full disclosure of which is incorporated herein by reference.

BACKGROUND

1. Field of the Disclosure

This disclosure generally relates to a touch device, more particularly, to a capacitive touch device with high sensitivity and an operating method thereof.

2. Description of the Related Art

Because a user can operate a touch panel by intuition, the touch panel has been widely applied to various electronic devices. In general, the touch panel is classified into capacitive, resistive and optical touch panels.

The capacitive touch sensor is further classified into self-capacitive touch sensors and mutual capacitive touch sensors. These two kinds of touch sensors have different characteristics of the capacitive variation, so they are adaptable to different functions. For example, the mutual capacitive touch sensors are adaptable to the multi-touch detection, and the self-capacitive touch sensors have a higher sensitivity to hovering operations and a lower sensitivity to water drops. However, how to improve the touch sensitivity of these two kinds of capacitive touch sensors is an important issue.

SUMMARY

Accordingly, the present disclosure provides a capacitive touch device with high sensitivity.

The present disclosure provides a capacitive touch device in which an emulation circuit is arranged in a control chip to generate a reference signal as a cancellation of a detection signal, and thus a size of a detection capacitor in the control chip is reduced.

The present disclosure provides a capacitive touch device in which an emulation circuit is arranged in a control chip to generate a reference signal as a cancellation of a detection signal, and thus a touch sensitivity is improved.

The present disclosure provides a capacitive touch device including a touch panel, an amplifying circuit, an emulation circuit and a subtraction circuit. The touch panel has a detection electrode. The amplifying circuit is coupled to the detection electrode, and configured to output a first detection signal when the detection electrode does not detect a touch and output a second detection signal when the detection electrode detects a touch. The emulation circuit is configured to output a reference signal. The subtraction circuit is configured to perform a differential operation between the reference signal and the first detection signal to generate a first differential detected signal, and perform a differential operation between the reference signal and the second detection signal to generate a second differential detected signal, wherein the first differential detected signal and the second differential detected signal are out-of-phase.

The present disclosure further provides a capacitive touch device including a touch panel, a detection capacitor, an input resistor, an amplifying circuit, an emulation circuit and a subtraction circuit. The touch panel has a detection electrode, and is configured to operate in a self-capacitive mode or a mutual capacitive mode. The detection capacitor is configured to be coupled to a signal input of the detection electrode in the self-capacitive mode and not to be coupled to the signal input of the detection electrode in the mutual capacitive mode. The input resistor is coupled to a signal output of the detection electrode. The amplifying circuit is coupled to the input resistor, and configured to output a detection signal. The emulation circuit includes an emulation detection capacitor, an emulation self-capacitor, an emulation mutual capacitor, an emulation input resistor and an emulation amplifying circuit, and is configured to output a first reference signal in the self-capacitive mode according to the emulation detection capacitor, the emulation self-capacitor, the emulation input resistor and the emulation amplifying circuit, or output a second reference signal in the mutual capacitive mode according to the emulation mutual capacitor, the emulation input resistor and the emulation amplifying circuit. The subtraction circuit is configured to perform a differential operation between the detection signal and the first reference signal in the self-capacitive mode or perform a differential operation between the detection signal and the second reference signal in the mutual capacitive mode to generate a differential detected signal.

The present disclosure further provides a capacitive touch device including a touch panel, an input resistor, an amplifying circuit, a flash, a digital-to-analog converter and a subtraction circuit. The touch panel has a detection electrode. The input resistor is coupled to a signal output of the detection electrode. The amplifying circuit is coupled to the input resistor, and configured to output a detection signal. The flash is configured to previously store at least one digital data. The digital-to-analog converter is configured to output at least one reference signal according to the at least one digital data. The subtraction circuit is configured to perform a differential operation between the detection signal and the at least one reference signal to generate a differential detected signal.

A capacitive touch device of the present disclosure is adaptable to a touch device which uses only a self-capacitive detection mode, and to a touch device which uses a dual-mode detection including the self-capacitive detection mode and a mutual capacitive detection mode.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

It should be noted that, wherever possible, the same reference numbers will be used throughout the drawings to refer to the same or like parts.

Figure 1:
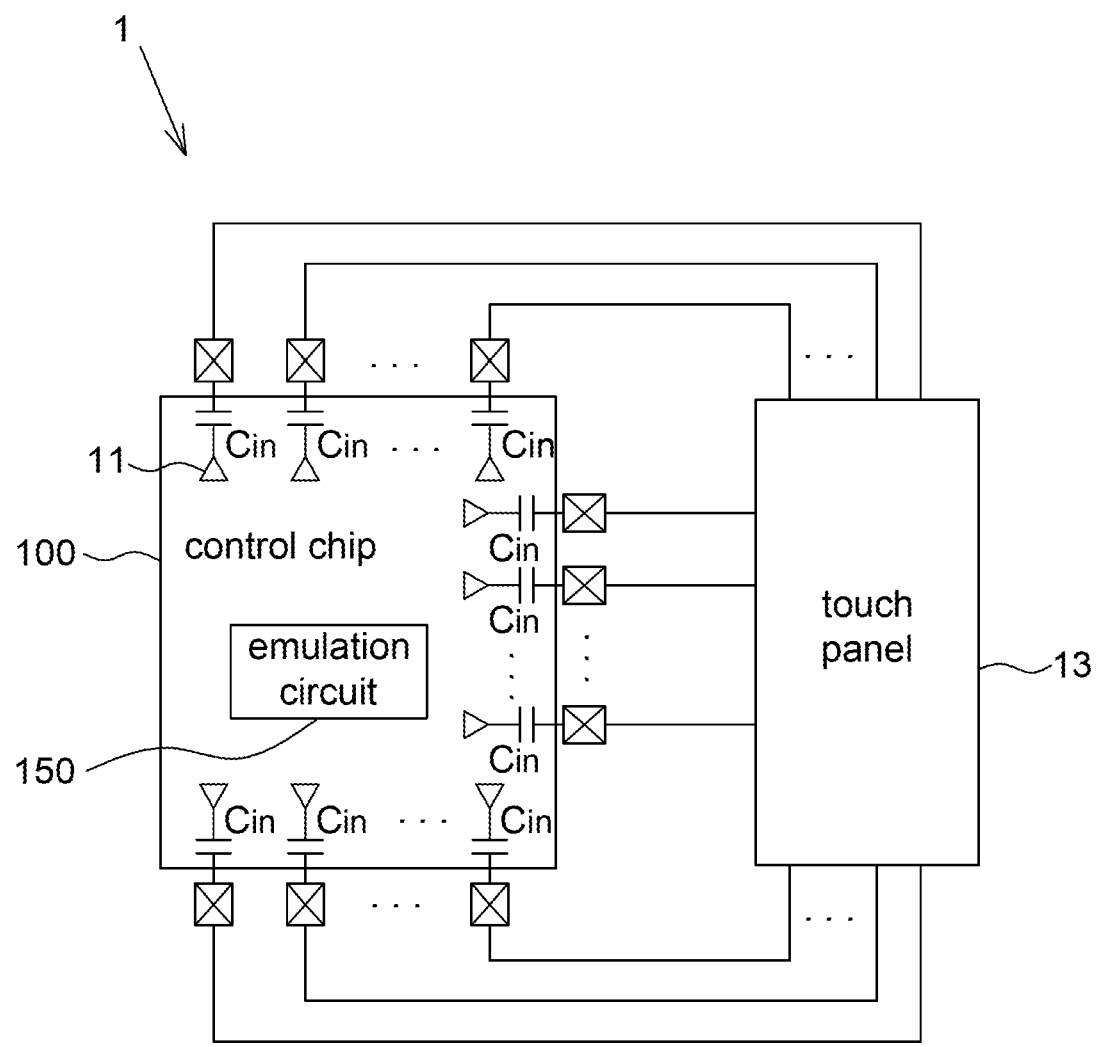
FIG. 1 is a schematic block diagram of a capacitive touch device according to one embodiment of the present disclosure.

Please refer to FIG. 1, it is a schematic block diagram of a capacitive touch device according to one embodiment of the present disclosure. The capacitive touch device 1 includes a control chip 100 and a touch panel 13, wherein the capacitive touch device 1 is preferably able to detect by a self-capacitive mode. In some embodiments, the capacitive touch device 1 is able to detect approaching objects and distinguish touch positions by successively using a self-capacitive mode and a mutual capacitive mode. For example, in some embodiments, because a scanning interval of the self-capacitive mode is short, the capacitive touch device 1 is able to identify whether any object is approaching using the self-capacitive mode. After an approaching object is identified, a touch position is identified using the mutual capacitive mode. In other embodiments, the capacitive touch device 1 is able to identify a rough position of an approaching object and determine a window of interest (WOI) on the touch panel 13 with the self-capacitive mode, and then identify a fine position within the window of interest with the mutual capacitive mode to reduce data amount to be processed in the mutual capacitive mode. It should be mention that implementations of the self-capacitive mode and the mutual capacitive mode mentioned above are only intended to illustrate, but not to limit the present disclosure.

The touch panel 13 includes a plurality of detection electrodes 131 to respectively form a self-capacitor $C_s$, wherein the detection electrodes 131 include a plurality of drive electrodes and a plurality of receiving electrodes extending along different directions, e.g., perpendicular to each other. Mutual capacitors $C_m$ (referring to FIGS. 2 and 3) are formed between the drive electrodes and the receiving electrodes. The principle of forming self-capacitors and mutual capacitors in a capacitive touch panel is known and is not an object of the present disclosure, and thus details thereof is not described herein.

The control chip 100 includes a plurality of drive circuits 11, a plurality of detection capacitors $C_{in}$ and an emulation circuit 150, wherein the emulation circuit 150 is used to emulate the characteristics of the detection line in a self-capacitive mode (described hereinafter). In the self-capacitive mode, the drive circuits 11 and the detection capacitors $C_{in}$ are electrically coupled to signal inputs of the detection electrodes 131 via pins. The drive circuits 11 output a drive signal Sd, e.g., a sine wave, a cosine wave or a square wave to the detection electrodes 131. In a mutual capacitive mode, only the drive circuit 11 corresponding to the drive electrode outputs the drive signal Sd, whereas the drive circuit 11 corresponding to the receiving electrode is bypassed.

Figure 2:
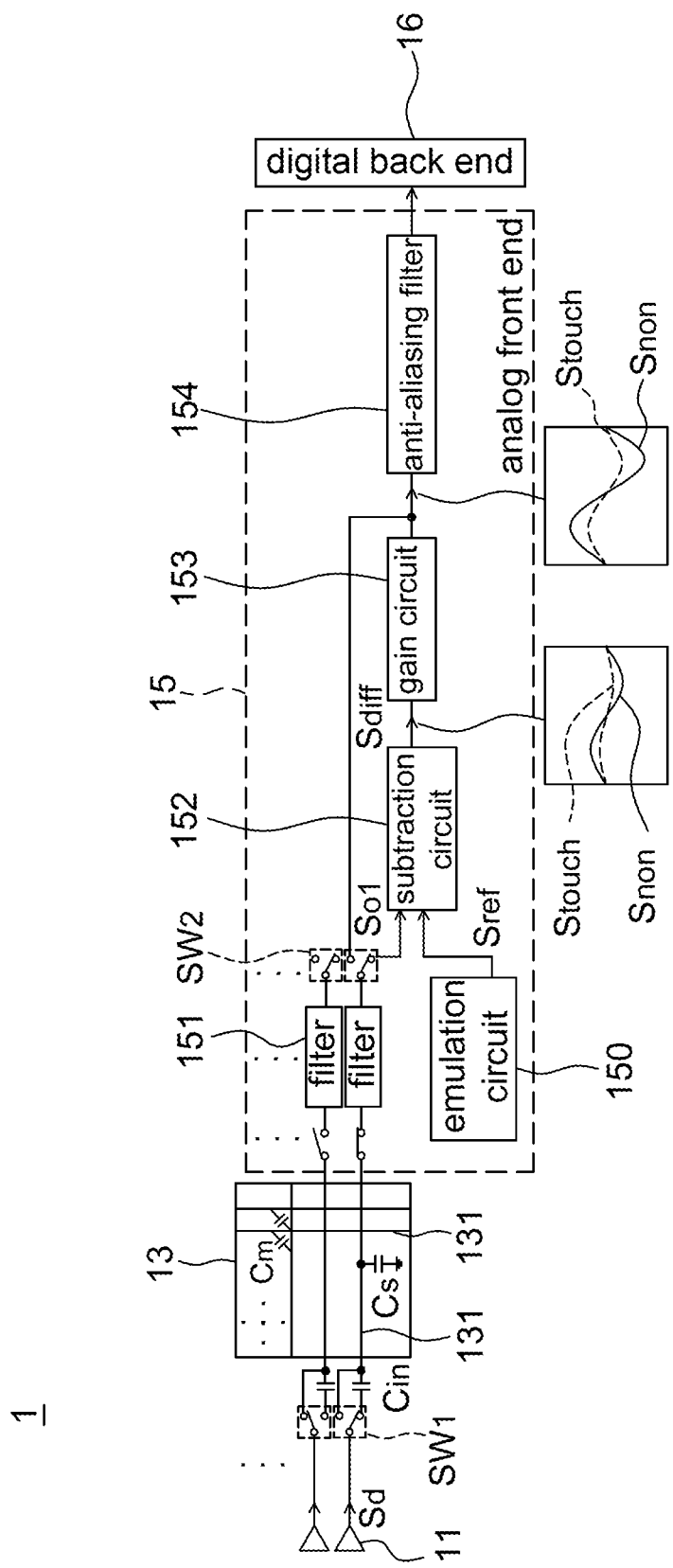
FIG. 2 is a schematic block diagram of a capacitive touch device according to one embodiment of the present disclosure.

Please refer to FIG. 2, it is a schematic block diagram of a capacitive touch device according to one embodiment of the present disclosure. As mentioned above, the capacitive touch device 1 includes a touch panel 13 and a control chip 100. The control chip 100 includes a plurality of drive circuits 11, a plurality of detection capacitors $C_{in}$, an analog front end 15 and a digital back end 16, wherein as the digital back end 16 is not an object of the present disclosure, details thereof are not described herein. In the present disclosure, the drive circuits 11 are able to be electrically coupled to signal inputs of the detection electrodes 131 via the detection capacitors $C_{in}$ (e.g. in the self-capacitive mode) or bypassing the detection capacitors $C_{in}$, (e.g. in the mutual capacitive mode), wherein said coupled to and bypassing the detection capacitors $C_{in}$ is able to be implemented by arranging a plurality of switches $SW_1$ between the drive circuits 11 and the touch panel 13.

Figure 3:
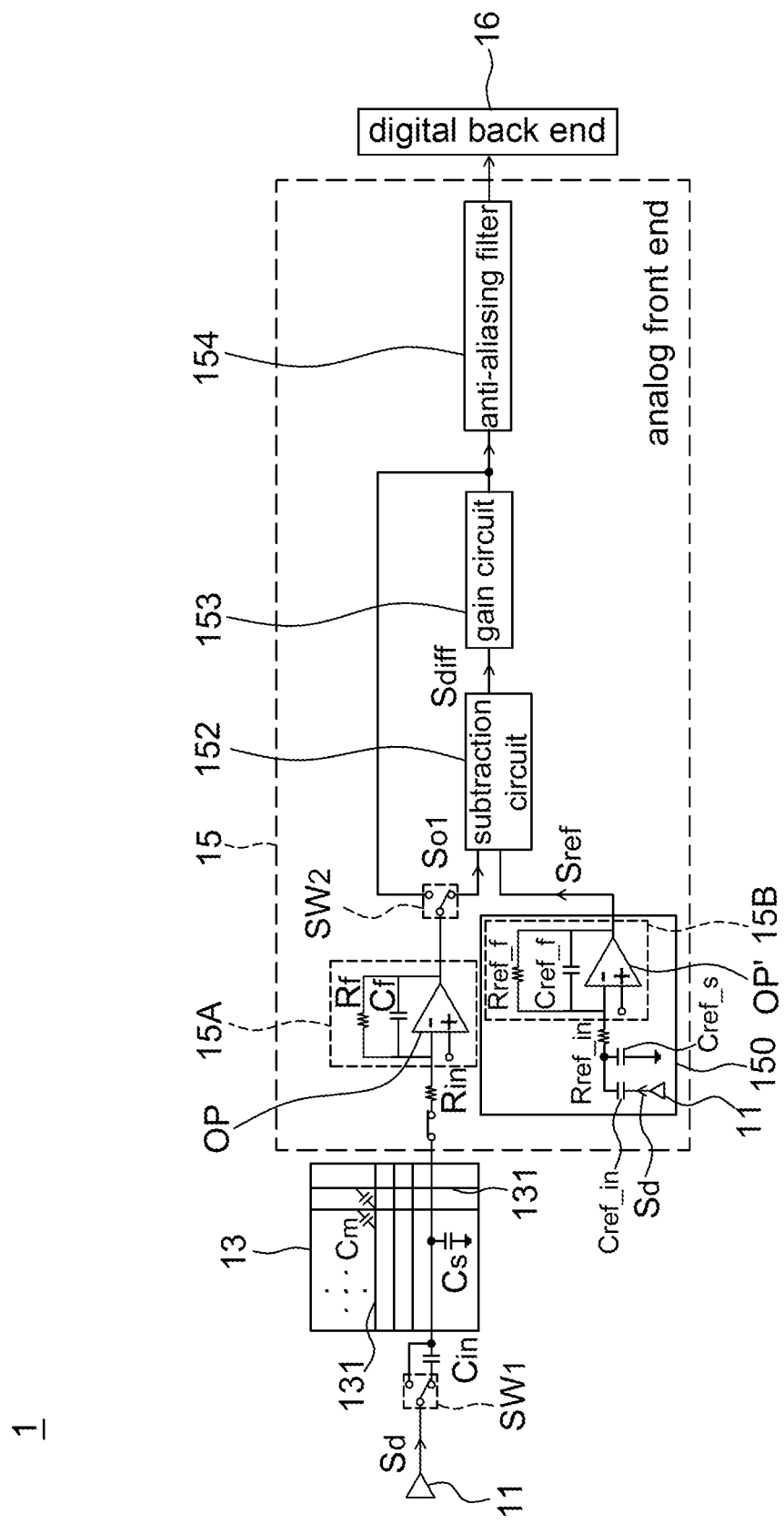
FIG. 3 is another schematic block diagram of a capacitive touch device according to one embodiment of the present disclosure.

The analog front end 15 includes an emulation circuit 150, a plurality of programmable filters 151, a subtraction circuit 52, a gain circuit 153 and an anti-aliasing filter (AAF) 154. The programmable filters 151, the detection capacitors $C_{in}$, and the self-capacitors $C_s$ of the detection electrodes 131 form a first filter circuit, wherein the first filter circuit is, e.g., a band-pass filter (BPF) or a high-pass filter (HPF). The first filter circuit is able to further form a band-pass filter having a predetermined bandwidth with a low-pass filter formed by the anti-aliasing filter 154. In one embodiment, the signal output of each detection electrode 131 is coupled to (e.g. via a switch) one programmable filter 151. It should be mentioned that although only the horizontally arranged detection electrodes 131 shown in FIGS. 2 and 3 are coupled to the programmable filters 151, in other embodiments the programmable filters 151 are also coupled to the longitudinally arranged detection electrodes 131, and the present disclosure is not limited to those shown in FIGS. 2 and 3. The connection of the programmable filters 151 is determined according to the operating mode of the capacitive touch device 1.

The emulation circuit 150 forms a second filter circuit and outputs a reference signal $S_{ref}$, wherein the second filter circuit is, e.g., a band-pass filter or a high-pass filter. The second filter circuit is able to further form a band-pass filter having a predetermined bandwidth with a low-pass filter formed by the anti-aliasing filter 154. The subtraction circuit 152 is coupled to the emulation circuit 150 and is sequentially and electrically coupled to the programmable filters 151 via switches $SW_2$ in a self-capacitive mode to be further electrically coupled to the detection electrodes 131. The subtraction circuit 152 performs a differential operation on the reference signal $S_{ref}$ outputted by the emulation circuit 150 and a detection signal $S_{o1}$ outputted by the coupled programmable filter 151 to output a differential detected signal $S_{diff}$. To be more precisely, in the present disclosure, the detection capacitors $C_{in}$, are respectively and electrically coupled to signal inputs of the detection electrodes 131 via a plurality of switches (e.g. $SW_1$), and the subtraction circuit 152 is respectively and electrically coupled to the programmable filters 151 and the detection electrodes 131 via a plurality of switches (e.g. $SW_2$).

In the present disclosure, the detection capacitor $C_{in}$ is disposed in the control chip 100 to form the voltage division with the self-capacitor $C_s$. Accordingly, the capacitive touch device 1 identifies a touch event according to a variation of peak-to-peak values of the differential detected signal $S_{diff}$, wherein the differential detected signal $S_{diff}$ is a continuous signal. Before a touch event is identified, the differential detected signal $S_{diff}$ is further filtered or digitized. For example, FIG. 2 shows the touched differential detected signal $S_{touch}$ and the non-touched differential detected signal $S_{non}$. However, as the self-capacitor $C_s$ is generally very large, an effective voltage division is implemented by using a large detection capacitor $C_{in}$. Therefore, the considerable disposition space in the chip for the large capacitor is necessary such that a total size of the control chip 100 is unable to be reduced.

Accordingly, in the present disclosure, the circuit characteristics of the detection line (e.g. from the drive circuit 11 via the detection capacitor $C_{in}$, the detection electrode 131 and the programmable filter 151) is emulated by disposing the emulation circuit 150 to output the reference signal $S_{ref}$ as a cancellation of the detection signal $S_{o1}$, as shown in FIG. 4. The capacitance of the detection capacitor $C_{in}$ is decreased by subtracting the cancellation from the detection signal $S_{o1}$ to reduce the dc signal level. For example, the capacitance of the detection capacitor $C_{in}$ is preferably smaller than 10 percent of capacitance of the self-capacitor $C_s$. Therefore, the size of the control chip 100 is effectively decreased.

To make a difference between the touched differential detected signal $S_{touch}$ and the non-touched differential detected signal $S_{non}$ be more obvious, in some embodiments a gain circuit 153 is employed to amplify the differential detected signal $S_{diff}$, wherein a gain of the gain circuit 153 is determined according to an analytical range of an analog-to-digital convertor (ADC) of the digital back end 16, but not limited thereto. As shown in FIG. 2, the difference between the touched differential detected signal $S_{touch}$, and the non-touched differential detected signal $S_{non}$, which are signals (i.e. differential detected signal) outputted by the gain circuit 153, is increased such that a touch event is easier to be identified. The anti-aliasing filter 154 filters the amplified differential detected signal and, as mentioned above, the anti-aliasing filter 154 is, for example, a low-pass filter.

Please refer to FIG. 3, it is another schematic block diagram of a capacitive touch device according to one embodiment of the present disclosure, wherein FIG. 3 further shows an implementation of the emulation circuit 150 and the programmable filter 151.

Figure 4A:
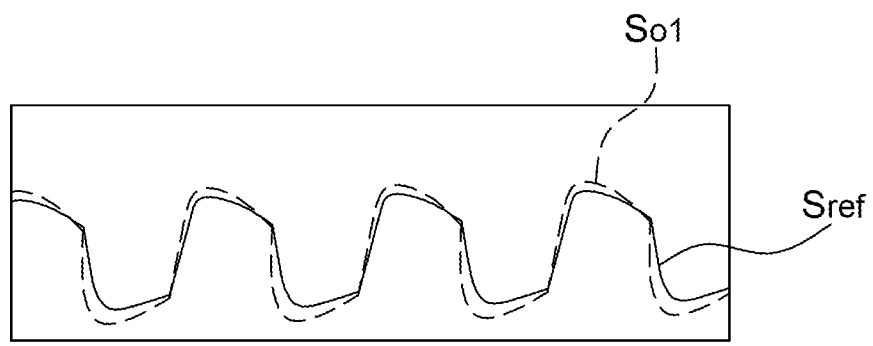
FIG. 4A is the waveform of a detection signal and a reference signal in the capacitive touch device of the embodiments of FIGS. 2 and 3.
Figure 4B:
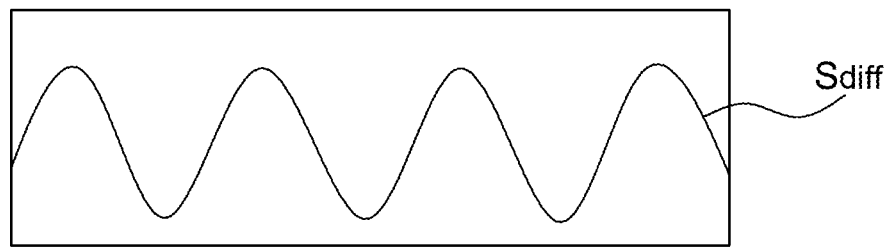
FIG. 4B is a waveform of a differential detected signal of the detection signal and the reference signal in FIG. 4A.

In some embodiments, the programmable filter 151 includes an input resistor $R_{in}$ and an amplifying circuit 15A, wherein the detection capacitor $C_{in}$, the self-capacitor $C_s$, the input resistor $R_{in}$ and the amplifying circuit 15A form a first filter circuit, and the emulation circuit 150 forms a second filter circuit. As mentioned above, the subtraction circuit 152 performs a differential operation on a detection signal $S_{o1}$, outputted by the first filter circuit and a reference signal $S_{ref}$ outputted by the second filter circuit to output a differential detected signal $S_{diff}$, as shown in FIGS. 4A and 4B, wherein FIG. 4B shows a waveform of a differential detected signal $S_{diff}$ of the detection signal $S_{o1}$ and the reference signal $S_{ref}$ shown in FIG. 4A.

Figure 6:
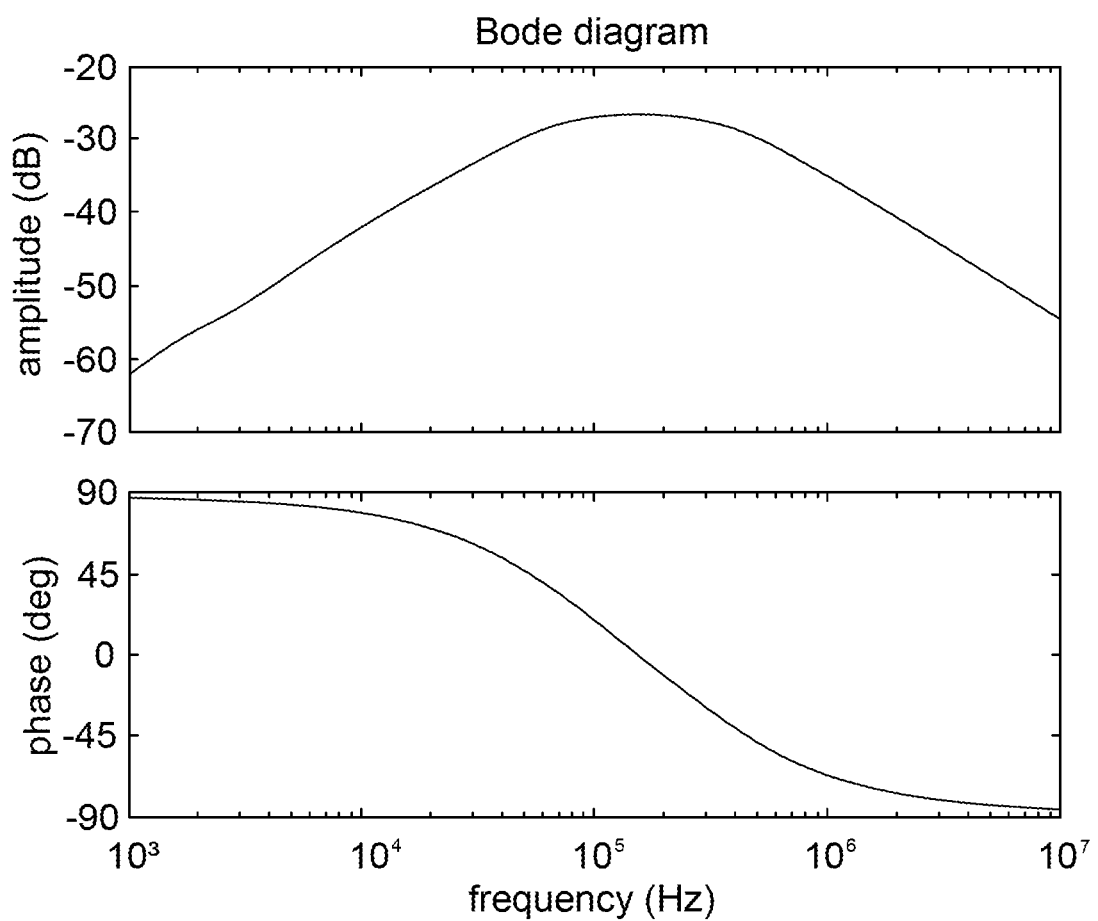
FIG. 6 is a frequency response of a filter circuit of a capacitive touch device according to one embodiment of the present disclosure.

In one embodiment, the amplifying circuit 15A is an integrated programmable gain amplifier (IPGA). For example, the amplifying circuit 15A includes an operational amplifier OP, a feedback resistor Rf and a compensation capacitor Cf. The feedback resistor Rf and the compensation capacitor Cf are connected between a negative input and an output of the operational amplifier OP. The input resistor $R_{in}$ is coupled between a second end (i.e. the signal output) of the detection electrode 131 and the negative input of the operational amplifier OP. A first end (i.e. the signal input) of the detection electrode 131 is coupled to the detection capacitor $C_{in}$. In this embodiment, a frequency response of the first filter circuit is indicated by equation (1) and the Bode diagram of FIG. 6, wherein the first filter circuit has two poles and a zero, which is located at 0.

$$(V_{out}/V_{in}) = -(Rf/R_{in}) \times (s \cdot C_{in} \cdot R_{in})/(1 - s \cdot Rf \cdot Cf) \times (1 + s \cdot R_{in} \cdot C_s + s \cdot R_{in} \cdot C_{in}) \quad (1)$$

As mentioned above, because an output of the emulation circuit 150 is used as a cancellation of the first filter circuit, the frequency response of the emulation circuit 150 is preferably similar to that of the first filter circuit, i.e. the frequency response of the emulation circuit 150 is determined according to a frequency response of the first filter circuit. In some embodiments, the two frequency responses are similar is referred to, for example, two poles of the emulation circuit 150 being close to two poles of the first filter circuit, but not limited thereto. For example, the two poles of the emulation circuit 150 are determined according to the two poles of the first filter circuit, and because the zero is not affected, only the pole frequencies are considered. For example, differences between pole frequencies of two poles of the emulation circuit 150 and frequencies of poles, which correspond to the two poles of the emulation circuit 150, of the second filter circuit is designed to be below 35 percent of the pole frequencies of the emulation circuit 150, and preferably to be below 20 percent. Although the two poles of the emulation circuit 150 are close to the two poles of the first filter circuit as much as possible, since it is difficult to precisely know the self-capacitor $C_s$ of each detection electrode 131 in advance, the emulation circuit 150 is designed by estimation.

In one embodiment, the emulation circuit 150 includes an emulation detection capacitor $C_{ref\_in}$, an emulation self-capacitor $C_{ref\_S}$, an emulation input resistor $R_{ref\_in}$ and an emulation amplifying circuit 15B, and connections between the emulation detection capacitor $C_{ref\_in}$, the emulation self-capacitor $C_{ref\_S}$, the emulation input resistor $R_{ref\_in}$ and the emulation amplifying circuit 15B are arranged based on connections between the detection capacitor $C_{in}$, the self-capacitor $C_s$, the input resistor $R_{in}$ and the amplifying circuit 15A to obtain a similar frequency response without particular limitations, e.g., having identical connections. That is, the emulation self-capacitor $C_{ref\_S}$ is used to emulate self-capacitor $C_s$ of the detection electrode 131, the emulation detection capacitor $C_{ref\_in}$ is used to emulate the detection capacitor $C_{in}$, the emulation input resistor $R_{ref\_in}$ corresponds to the input resistor $R_{in}$, and the emulation amplifying circuit 15B corresponds to the amplifying circuit 15A. It should be mentioned that the circuit parameter of the emulation circuit 150 (i.e. RC value) is not necessary to be completely the same as the circuit parameter of the first filter circuit, as long as the frequency response of the emulation circuit 150 is similar to the frequency response of the first filter circuit, and the detection capacitor $C_s$ is decreased without particular limitations.

The emulation amplifying circuit 15B also includes an operational amplifier OP', an emulation feedback resistor $R_{ref\_f}$ and an emulation compensation capacitor $C_{ref\_p}$, wherein connections of elements in the emulation amplifying circuit 15B are arranged based on those of the amplifying circuit 15A without particular limitations, e.g., having identical connections. Therefore, a second filter circuit formed by the emulation circuit 150 also has a similar frequency response as the equation (1) and the Bode diagram of FIG. 6. The difference is that all element parameters of the emulation circuit 150 are predesigned. Accordingly, positions of two poles are adjustable by changing the element parameters, i.e. resistance and capacitance, of the emulation circuit 150.

Figure 5:
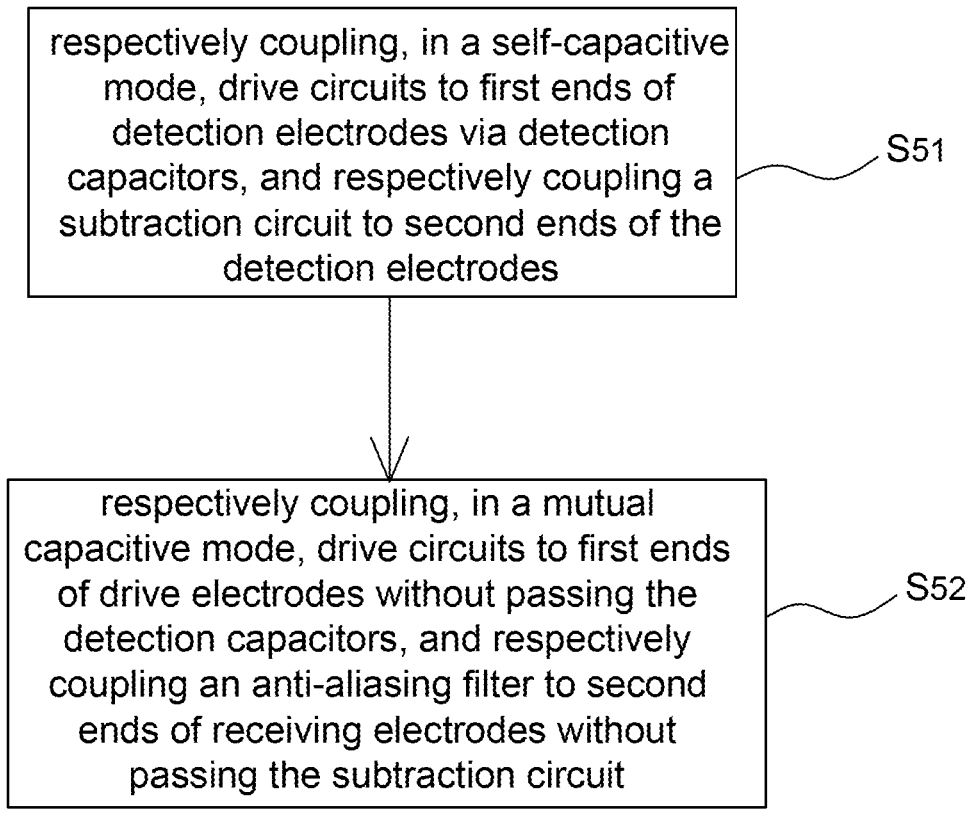
FIG. 5 is a flow chart of an operating method of a capacitive touch device according to one embodiment of the present disclosure.

Please refer to FIG. 5, it is a flow chart of an operating method of a capacitive touch device according to one embodiment of the present disclosure, including a self-capacitive mode (step $S_{51}$) and a mutual capacitive mode (step $S_{52}$). In this embodiment, the self-capacitive mode and the mutual capacitive mode is separately operated, e.g., firstly identifying an approaching object and/or a window of interest (WOI) using the self-capacitive mode and identifying a touch positions and/or a gesture using the mutual capacitive mode.

In the self-capacitive mode, the drive circuits 11 are respectively and electrically coupled to first ends of the drive electrodes via the detection capacitors $C_{in}$, and the subtraction circuit 152 is respectively and electrically coupled to second ends of the drive electrodes. Meanwhile, because the subtraction circuit 152 receives a reference signal $S_{ref}$ outputted by the emulation circuit 150 and the subtraction circuit 152 is electrically coupled to the second end of the drive electrodes via a programmable filter 151, the subtraction circuit 152 performs a differential operation on a detection signal $S_{o1}$ outputted by the programmable filter 151 and the reference signal $S_{ref}$ outputted by the emulation circuit 150 to output a differential detected signal $S_{diff}$, as shown in FIGS. 4A and 4B. Then, a gain circuit 153 amplifies the differential detected signal $S_{diff}$ to make a difference between a touched differential detected signal $S_{touch}$ and a non-touched differential detected signal $S_{non}$ be more significant, as shown in FIG. 2. Furthermore, in one embodiment, a touch event is identified by detecting detection signals outputted by a plurality of drive electrodes or a plurality of receiving electrodes to operate in a shorter scanning period.

In another embodiment, detection signals outputted by a plurality of drive electrodes and a plurality of receiving electrodes are detected to identify a window of interest (WOI) on the touch panel in a self-capacitive mode. Therefore, in the self-capacitive mode, the drive circuits 11 are respectively and electrically coupled to the first ends (i.e. signal inputs) of the receiving electrodes via the detection capacitors $C_{in}$, and the subtraction circuit 152 is sequentially and electrically coupled to second ends (i.e. signal outputs) of the receiving electrodes. The window of interest is determined after identifying the drive electrode and the receiving electrode that sense an approaching object. As mentioned above, in the present disclosure the drive electrodes and the receiving electrodes are both belong to the detection electrodes 131 to generate mutual capacitors $C_m$ therebetween.

In the mutual capacitive mode, the drive circuits 11 are respectively and electrically coupled to the first ends of the drive electrodes without passing the detection capacitors $C_{in}$. For example in FIGS. 2 and 3, the drive circuits 11 bypass the detection capacitor $C_{in}$ using a switch $SW_1$ and directly input the drive signal $S_d$ to the detection electrode 131. Besides, the anti-aliasing filter 154 is respectively and electrically coupled to the second ends of the drive electrodes without passing the subtraction circuit 152. For example in FIGS. 2 and 3, the anti-aliasing filter 154 bypasses the subtraction circuit 152 (and the gain circuit 153) using another switch $SW_2$, to allow the detection signal $S_{o1}$ outputted by the programmable filter 151 to be directly outputted to the anti-aliasing filter 154. The filter parameter of the anti-aliasing filter 154 is determined according to actual applications without particular limitation.

In the present disclosure, in the self-capacitive mode because signals sent to the detection lines do not pass resistors and capacitors of the panel, a phase difference between the reference line (i.e. emulation circuit) and the detection line is not obvious. Therefore, the reference signal $S_{ref}$ is used as a cancellation to be subtracted from a detection signal.

It should be mentioned that, although the amplitude (or peak-to-peak value) of a non-touched differential detected signal $S_{non}$ is shown to be larger than the amplitude (or peak-to-peak value) of a touched differential detected signal $S_{touch}$ in FIG. 2, it is only intended to illustrate but not to limit the present disclosure. According to the parameter setting of the emulation circuit 150 (i.e. RC value), it is possible that the amplitude of the touched differential detected signal $S_{touch}$ is larger than the amplitude of the non-touched differential detected signal $S_{non}$.

It should be mentioned that although the amplitude (or peak-to-peak value) of a detection signal $S_{o1}$ is shown to be larger than the amplitude (or peak-to-peak value) of a reference signal $S_{ref}$ in FIG. 4A, it is only intended to illustrate but not to limit the present disclosure. According to the parameter setting of the emulation circuit 150 (i.e. RC value), it is possible that the amplitude of the reference signal $S_{ref}$ is larger than the amplitude of the detection signal $S_{o1}$.

In other embodiments, by changing the circuit parameter of the emulation circuit 150, it is used to awaken a sleep mode of the capacitive touch device 1. In this sleep mode, most of the operations of the touch detection are performed by the analog front end 15 such that the amount of complicated post-processing of the digital backend 16 is reduced thereby reducing the total power consumption.

Figure 7:
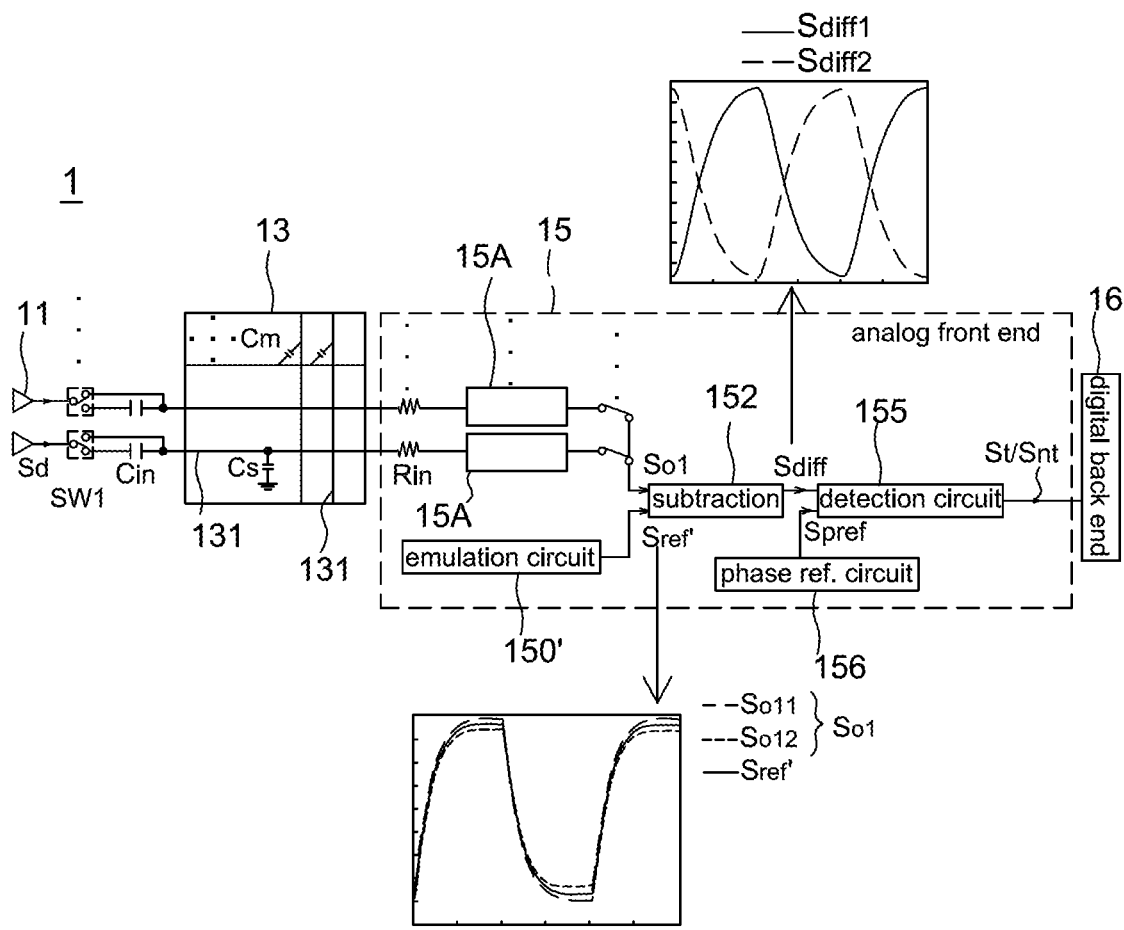
FIG. 7 is a block diagram of a capacitive touch device according to another embodiment of the present disclosure.

Referring to FIG. 7, it is a block diagram of a capacitive touch device 1 according to another embodiment of the present disclosure. The analog front end 15 in this embodiment further has the mechanism for awakening the capacitive touch device 1 under sleep mode. In other words, the capacitive touch device 1 of FIG. 7 is combinable to FIG. 3. For example, the analog front end 15 further includes a multiplexer or a switch (e.g., switching between the subtraction circuit 152, the gain circuit 153 and the detection circuit 155) such that the circuit connection is switched to FIG. 7 in a sleep mode but switched to FIG. 3 in a normal mode (non-sleep mode), wherein the normal mode herein is referred to a mode for calculating the touch position and/or gesture, while the sleep mode is referred to a mode not calculating the touch position or gesture. Accordingly, after a touch event is detected using FIG. 7, the operating method mentioned in FIGS. 2-3 and 5 is then performed.

As mentioned above, the capacitive touch device 1 includes a touch panel 13, a driving end and a detecting end. The detecting end includes the analog front end 15 and the digital back end 16. Details of the drive circuit 11, the plurality of switches $SW_1$ and the detection capacitor $C_{in}$ included in the driving end, the detection electrode 131 included in the touch panel 13, and the digital back end 16 have been described above. For example, the touch panel 13 is operable in a self-capacitive mode or a mutual capacitive mode. The detection capacitor $C_{in}$ is coupled to a signal input of the detection electrode 131 in the self-capacitive mode but is bypassed from the signal input of the detection electrode 131 by the switch $SW_1$, i.e. not connecting to the detection electrode 131.

The analog front end 15 includes a plurality of input resistors $R_{in}$, a plurality of amplifying circuits 15A (referring to FIG. 3), an emulation circuit 150', a subtraction circuit 152, a detection circuit 155 and a phase reference circuit 156, wherein the detection circuit 155 is a phase detection circuit. As mentioned above, the driving end and the detecting end are arranged in the control chip 100.

As mentioned above, the input resistors $R_{in}$ are respectively coupled to the signal output of the detection electrodes 131. The amplifying circuits 15A are coupled to the detection electrodes 131 via the input resistors $R_{in}$ and output a detection signal $S_{o1}$. When a conductor is touching or close to the touch panel 13, the detection signal $S_{o1}$ is changed. For example, FIG. 7 shows that the amplifying circuit 15A outputs a first detection signal $S_{o11}$ when the detection electrode 131 does not sense a touch, and the amplifying circuit 15A outputs a second detection signal $S_{o12}$ when the detection electrode 131 senses a touch. Without being indicated specifically, the detection signal $S_{o1}$ is herein referred to one of the first detection signal $S_{o11}$ and the second detection signal $S_{o12}$. As mentioned above, amplitudes of the first detection signal $S_{o11}$ and the second detection signal $S_{o12}$ are exchanged according to different applications.

A difference between this embodiment and the previous embodiment is that the reference signal $S_{ref}'$ outputted by the emulation circuit 150' in FIG. 7 is different from the reference signal $S_{ref}$ outputted by the emulation circuit 150 in FIG. 2. In the previous embodiment, the reference signal $S_{ref}$ outputted by the emulation circuit 150 is generated similar to the detection signal $S_{o1}$ as much as possible. In this embodiment, a waveform of the reference signal $S_{ref}'$ outputted by the emulation circuit 150' is selected between waveforms of the first detection signal $S_{o11}$ and the second detection signal $S_{o12}$, as shown in FIG. 7 for instance.

The subtraction circuit 152 is also used to calculate a difference between the detection signal $S_{o1}$ (the first detection signal $S_{o11}$ or the second detection signal $S_{o12}$ depending on whether there is a conductor close to the touch panel 13) and the reference signal $S_{ref}'$ to output a differential detected signal $S_{diff}$.

For example, the subtraction circuit 152 performs a differential operation between the reference signal $S_{ref}'$ and the first detection signal $S_{o11}$ to generate a first differential detected signal, e.g., $S_{diff1}=S_{o11}-S_{ref}'$ (as shown in FIG. 7), and performs a differential operation between the reference signal $S_{ref}'$ and the second detection signal $S_{o12}$ to generate a second differential detected signal, e.g., $S_{diff2}=S_{o12}-S_{ref}'$ (as shown in FIG. 7). According to the arrangement of the waveform of the reference signal $S_{ref}'$, the first differential detected signal $S_{diff1}$ and the second differential detected signal $S_{diff2}$ have a 180 degree phase difference or referred as out-of-phase. This embodiment uses this phase difference to identify whether the touch panel 13 detects a touch event or not.

Figure 8A:
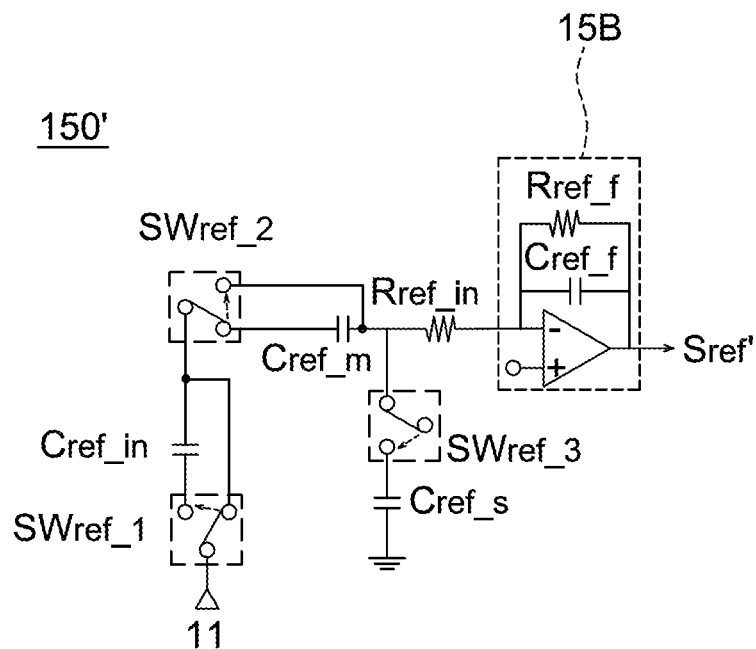
FIG. 8A is a circuit diagram of an emulation circuit of a capacitive touch device according to another embodiment of the present disclosure.

In one embodiment, the emulation circuit 150' of FIG. 8A includes, similar to FIG. 3, an emulation detection capacitor $C_{ref\_in}$, an emulation self-capacitor $C_{ref\_S}$, an emulation input resistor $R_{ref\_in}$ and an emulation amplifying circuit 15B. In addition, the emulation circuit 150' of this embodiment further includes an emulation mutual capacitor $C_{ref\_m}$ which is used to emulate the mutual capacitor $C_m$ between detection electrodes 131 of the touch panel 13.

In addition, as shown in FIG. 8A, the emulation circuit 150' of this embodiment further includes switches $SW_{ref\_1}$, $SW_{ref\_2}$ and $SW_{ref\_3}$ to operate in conjunction with the self-capacitive mode or the mutual capacitive mode of the touch panel 13.

In the self-capacitive mode, the switch $SW_{ref\_2}$ bypasses the emulation mutual capacitor $C_{ref\_m}$ whereas the switches $SW_{ref\_1}$ and $SW_{ref\_3}$ are conducted to connect the emulation detection capacitor $C_{ref\_in}$ and the emulation self-capacitor $C_{ref\_S}$ to form the emulation circuit 150 similar to FIG. 3. That is, under the self-capacitive mode, the emulation circuit 150' outputs a first reference signal (or self-capacitive reference signal) according to the emulation detection capacitor $C_{ref\_in}$, the emulation self-capacitor $C_{ref\_S}$, the emulation input resistor $R_{ref\_in}$ and the emulation amplifying circuit 15B.

However, in order to allow the waveform of the first reference signal to be between waveforms of the first detection signal $S_{o11}$ (also generated in the self-capacitive mode) and the second detection signal $S_{o12}$ (also generated in the self-capacitive mode), capacitance of the emulation self-capacitor $C_{ref\_S}$ is selected according to the variation of the detection signal $S_{o1}$ caused by the touch. In one embodiment, the capacitance of the emulation self-capacitor $C_{ref\_S}$ is selected as 0.92 to 0.98 times of capacitance of the self-capacitor $C_S$ of the detection electrode 131 of the touch panel 13 since a touch generally induces 10% variation of the detection signal $S_{o1}$. It is appreciated that when the variation of the detection signal $S_{o1}$ caused by the touch is different, said 0.92 to 0.98 times are changed.

The subtraction circuit 152 performs, in the self-capacitive mode, the differential operation between the detection signal $S_{o1}$ and the first reference signal to generate the differential detected signal $S_{diff}$.

In the mutual capacitive mode, the switches $SW_{ref\_1}$ and $SW_{ref\_3}$ respectively bypass the emulation detection capacitor $C_{ref\_2}$ in and the emulation self-capacitor $C_{ref\_S}$ whereas the switch $SW_{ref\_2}$ is conducted to connect the emulation mutual capacitor $C_{ref\_m}$, i.e. the connection shown in FIG. 8A. That is, under the mutual capacitive mode, the emulation circuit 150' outputs a second reference signal (or mutual capacitive reference signal) according to the emulation mutual capacitor $C_{ref\_m}$, the emulation input resistor $R_{ref\_in}$ and the emulation amplifying circuit 15B. In this embodiment, as the circuit components for generating the first reference signal and the second reference signal are different, the first reference signal is different from the second reference signal.

Similarly, in order to allow the waveform of the second reference signal to be between waveforms of the first detection signal $S_{o11}$ (also generated in the mutual capacitive mode) and the second detection signal $S_{o12}$ (also generated in the mutual capacitive mode), capacitance of the emulation mutual capacitor $C_{ref\_m}$ is selected as 0.92 to 0.98 times of capacitance of the mutual capacitor $C_m$ of the detection electrode 131 of the touch panel 13, wherein the arrangement of said 0.92 to 0.98 times is similar to that mentioned above.

The subtraction circuit 152 performs, in the mutual capacitive mode, the differential operation between the detection signal $S_{o1}$ and the second reference signal to generate the differential detected signal $S_{diff}$.

It is appreciated that although FIG. 8A shows that the emulation circuit 150' includes three switches $SW_{ref\_1}$, $SW_{ref\_2}$, and $SW_{ref\_3}$, emulation detection capacitor $C_{ref\_in}$, emulation self-capacitor $C_{ref\_hd\_S}$ and emulation mutual capacitor $C_{ref\_m}$ to operate in conjunction with two operating modes, it is only intended to illustrate but not to limit the present disclosure. In some embodiments, the capacitive touch device 1 performs the touch detection using one of the self-capacitive mode and the mutual touch mode to end the sleep mode, and it is not necessary to use both modes together.

For example, when the capacitive touch device 1 only uses the mutual capacitive mode to perform the touch detection, the emulation circuit 150' in FIG. 8A does not include the switches $SW_{ref\_2}$ and $SW_{ref_{i_3}3}$, the emulation detection capacitor $C_{ref\_in}$ and the emulation self-capacitor $C_{ref\_S}$. For example, when the capacitive touch device 1 only uses the self-capacitive mode to perform the touch detection, the emulation circuit 150' in FIG. 8A does not include the switches $SW_{ref\_1}$, $SW_{ref\_2}$ and $SW_{ref\_3}$ and the emulation mutual capacitor $C_{ref\_m}$.

Figure 8B:
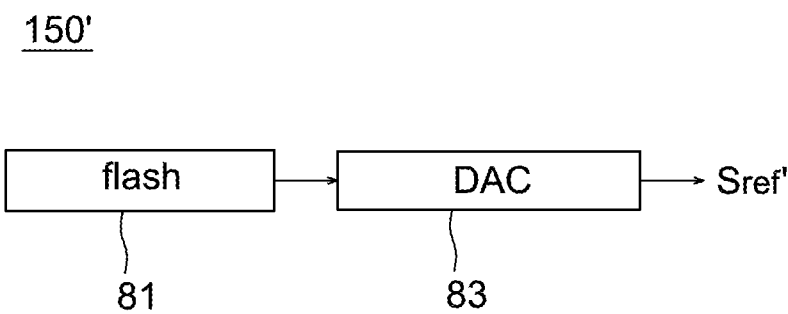
FIG. 8B is a block diagram of an emulation circuit of a capacitive touch device according to another embodiment of the present disclosure.

In another embodiment, the emulation circuit 150' includes a flash 81 and a digital-to-analog converter (DAC) 83 shown in FIG. 8B instead of being implemented by the circuit shown in FIG. 8A. The DAC 83 generates the reference signal $S_{ref}'$ according to at least one digital data stored in the flash 81. Since the flash 81 stores digital data, the flash 81 is included in, as one example, in the digital back end 16.

As mentioned above, the capacitive touch device 1 performs, in the sleep mode, the touch detection using at least one of the self-capacitive mode and the mutual capacitive mode. Therefore, the flash 81 preferably stores at least one of first digital data used in the self-capacitive mode and second digital data used in the mutual capacitive mode.

The first digital data is previously obtained and stored in the flash 81 according to a first detection signal $S_{o11}$ and a second detection signal $S_{o12}$, wherein the first detection signal $S_{o11}$ is outputted by the amplifying circuit 15A in the self-capacitive mode by emulating the touch panel 13 being touched and the second detection signal $S_{o12}$ is outputted by the amplifying circuit 15A in the self-capacitive mode by emulating the touch panel 13 not being touched. The touch emulation is performed by, for example, connecting a build-in self test (BIST) circuit in parallel with the detection electrode 131 of the touch panel 13, e.g., the equivalent capacitor circuit emulating a human body or a finger. When said BIST circuit is connected (e.g., switch on via a switch) to the electrode 131, it means that a touch occurs; whereas, when said BIST circuit is not connected (e.g., switch off via a switch) to the detection electrode 131, it means that a touch does not occur. In this way, the touch operation is emulated.

The first digital data is to cause a waveform of the first reference signal (similar to $S_{ref}'$ in FIG. 7) to be between waveforms of the first detection signal $S_{o11}$ and second detection signal $S_{o12}$. A way to generate the first data is to, for example, sequentially connect and disconnect the BIST circuit in the self-capacitive mode of the touch panel 13 to obtain two data sets (e.g., the data obtained by sampling waveforms of $S_{o11}$ and $S_{o12}$ in FIG. 7), and then to calculate the first digital data according to the two data sets, e.g., calculating an average of two corresponding sample dots of the two data sets, but not limited to.

Similarly, the second digital data is previously obtained and stored in the flash 81 according to a third detection signal (similar to $S_{o11}$) and a fourth detection signal (similar to $S_{o12}$), wherein the third detection signal is outputted by the amplifying circuit 15A in the mutual capacitive mode by emulating the touch panel 13 being touched and the fourth detection signal is outputted by the amplifying circuit 15A in the mutual capacitive mode by emulating the touch panel 13 not being touched. The second digital data is to cause a waveform of the second reference signal (similar to $S_{ref}'$ in FIG. 7) to be between waveforms of the third and fourth detection signals, wherein the way of generating the second digital data is similar to that of generating the first data only the operating mode of the capacitive touch device 1 being different.

During the touch detection, the DAC 83 outputs, in the self-capacitive mode, a first reference signal according to the first digital data or outputs, in the mutual capacitive mode, a second reference signal according to the second digital data. It is appreciated that when a frequency of sampling the detection signal $S_{o11}$ or $S_{o12}$ exceeds 2 times of Nyquist frequency, the original reference signal is restored according to the digital data. As mentioned above, in some embodiments the flash 81 stores only one of the first digital data and the second digital data, and thus the DAC 83 generates only one of the first reference signal and the second reference signal.

The operation of the subtraction circuit 152 is similarly to that mentioned above. For example, the subtraction circuit 152 performs, under the self-capacitive mode, differential calculation between the detection signal $S_{o1}$ and the first reference signal or performs, under the mutual capacitive mode, the differential calculation between the detection signal $S_{o1}$ and the second reference signal to generate the differential detected signal $S_{diff}$.

The capacitive touch device 1 further includes a phase reference circuit 156 used to generate a phase reference signal $S_{pref}$ and includes a detection circuit 155 used to compare phases between the differential detected signal $S_{diff}$ and the phase reference signal $S_{pref}$ to confirm whether the capacitive touch device 1 is touched or not. The detection circuit 155 is electrically coupled to the subtraction circuit 152 and the phase reference circuit 156. In one embodiment, the detection circuit 155 is implemented by a differential operational amplifier.

As shown in FIG. 7, it is assumed that the subtraction circuit 152 outputs a first differential detected signal $S_{diff1}$ when a touch does not happen and outputs a second differential detected signal $S_{diff2}$ when a touch occurs. The detection circuit 155 compares phases of the first differential detected signal $S_{diff1}$ and/or the second differential detected signal $S_{diff2}$ with a phase of the phase reference signal $S_{pref}$ to output a touch signal St or a non-touch signal Snt.

For example, it is assumed that the phase reference signal $S_{pref}$ is selected to have the same phase as the non-touch differential detected signal (i.e. $S_{diff1}$). When the detection circuit 155 identifies that the differential detected signal Sniff is substantially in phase with the phase reference signal $S_{pref}$, it is identified that a touch does not occur and the detection circuit 155 generates a non-touch signal Snt, which indicates that the touch panel 13 is not touched, to the digital backend 16. The digital back end 16 maintains the capacitive touch device 1 in the sleep or low power mode. When the detection circuit 155 identifies that the differential detected signal $S_{diff}$ is out-of-phase (180 degrees phase difference) with the phase reference signal $S_{pref}$, it is identified that a touch event occurs and the detection circuit 155 generates a touch signal St, which indicates the touch panel 13 being touched, to the digital back end 16. The digital back end 16 wakes up the capacitive touch device 1, which then performs the operation in the previous embodiment as shown in FIGS. 2-3 and 5.

In another embodiment, the detection circuit 155 generates the control signal St to the digital back end 16 to awaken the capacitive touch device 1 only when a touch even occurs, or no control signal is generated.

The phase reference circuit 156 is formed by a proper way without particular limitations as long as a phase reference signal $S_{pref}$ is generated to the detection circuit 155 as a phase reference. The phase of the phase reference signal $S_{pref}$ is selected to be identical to the $S_{diff1}$, $S_{diff2}$ or a combination thereof without particular limitations as long as identifiable by the detection circuit 155.

In one embodiment, the touch panel 13 includes at least one null line to generate a dummy signal $S_{o1\_dummy}$, and the null line is arranged to have capacitance ($C_S$, $C_m$) not being effected by the touch event, e.g., a shield layer being formed thereupon. In other words, the dummy signal $S_{o1\_dummy}$ always indicates a non-touch detection signal. The phase reference circuit 156 includes the at least one null line, the emulation circuit 150' and the subtraction circuit 152. More specifically, the phase reference circuit 156 is a circuit arranged to generate the phase reference signal $S_{pref}$ in the capacitive touch device 1 in addition and identical to the circuit actually for detecting the touch event.

Figure 9A:
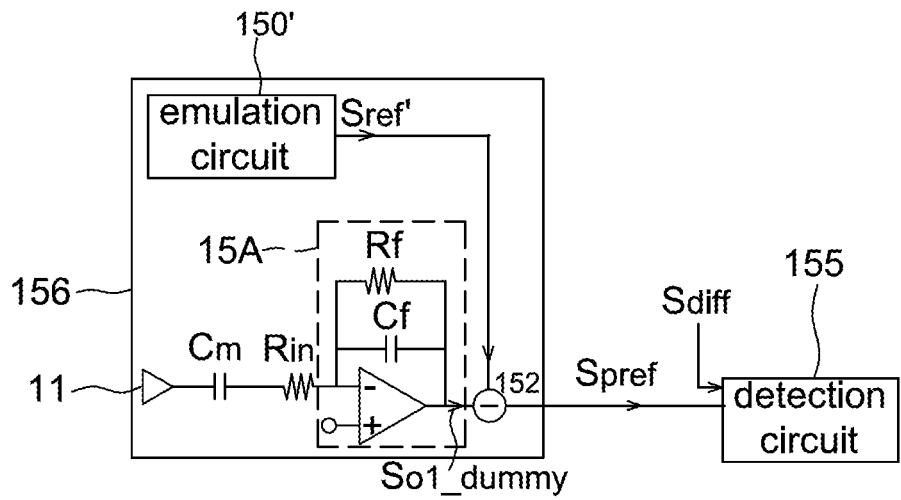
FIGS. 9A-9B are circuit diagrams of the phase reference circuit of a capacitive touch device according to another embodiment of the present disclosure.

For example, FIG. 9A shows a circuit diagram of a phase reference circuit 156 corresponding to the mutual capacitive mode. The phase reference circuit 156 includes a drive circuit 11, a mutual capacitor Cm, formed by a null line (e.g., a null detection electrode 131), an input resistor $R_{in}$, an amplifying circuit 15A, an emulation circuit 150' and a subtraction circuit 152. The emulation circuit 150' includes at least the components in FIG. 8A corresponding to the mutual capacitive mode (or including all components shown in FIG. 8A and changing the connection by switches as mentioned above). The subtraction circuit 152 then outputs the phase reference signal $S_{pref}$ similar to $S_{diff1}$ shown in FIG. 7. The phase reference signal $S_{pref}$ is used as a basis to identify the touch or non-touch.

Figure 9B:
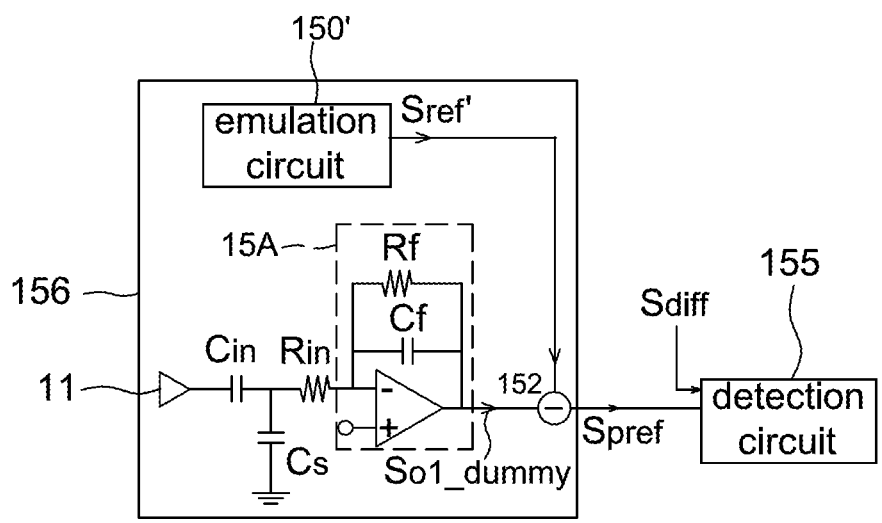

For example, FIG. 9B shows a circuit diagram of a phase reference circuit 156 corresponding to the self-capacitive mode. The phase reference circuit 156 includes a drive circuit 11, a detection capacitor $C_{in}$, a self-capacitor $C_S$ formed by a null line (e.g., a null detection electrode 131), an input resistor $R_{in}$, an amplifying circuit 15A, an emulation circuit 150' and a subtraction circuit 152. The emulation circuit 150' includes at least the components in FIG. 8A corresponding to the self-capacitive mode (or including all components shown in FIG. 8A and changing the connection by switches as mentioned above). The subtraction circuit 152 then outputs the phase reference signal $S_{pref}$ similar to $S_{diff1}$ shown in FIG. 7. The phase reference signal $S_{pref}$ is used as a basis to identify the touch or non-touch.

Figure 9C:
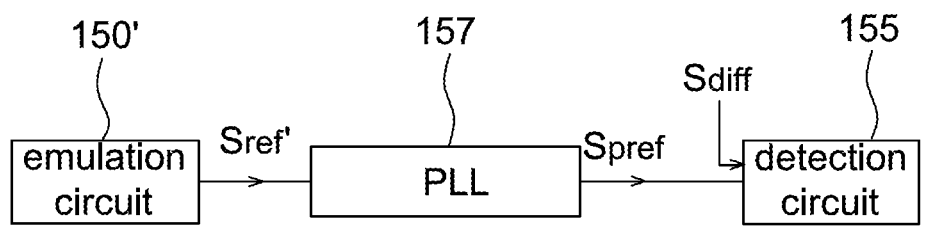
FIGS. 9C-9D are block diagrams of the phase reference circuit of a capacitive touch device according to another embodiment of the present disclosure.

In another embodiment, the phase reference circuit 156 includes a phase lock loop (PLL) 157 which is used to lock a phase of the reference signal $S_{ref}'$ outputted by the emulation circuit 150' as shown in FIG. 9C. As mentioned above, as the emulation circuit 150' is disposed in the control chip 100 without being affected by an external conductor, the reference signal $S_{ref}'$ substantially has the same phase with the non-touch differential detected signal.

Similarly, according to different operating modes, the connected capacitors in the emulation circuit 150' are different and thus the outputted reference signals $S_{ref}'$ are also different. It is assumed that the emulation circuit 150' outputs a first reference signal in the self-capacitive mode and outputs a second reference signal in the mutual capacitive mode, and thus the phase lock loop 157 locks the phase of the first reference signal under the self-capacitive mode and locks the phase of the second reference signal under the mutual capacitive mode.

Figure 9D:
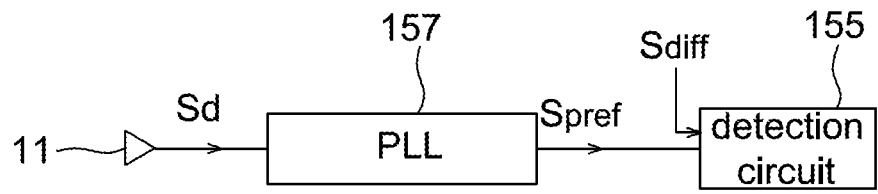

In another embodiment, the phase reference circuit 156 includes a phase lock loop 57 which locks the phase of the drive signal Sd outputted by the drive circuit 11 as shown in FIG. 9D. Although the drive signal Sd is not influenced by the external conductor, the differential detected signal $S_{diff}$ to be compared is obtained by a signal passing through the touch panel 13 to have a phase shift. Therefore, the differential detected signal $S_{diff}$ is not just in phase or out-of-phase with the drive signal Sd. In this embodiment, the detection circuit 155 detects whether a phase difference between the differential detected signal $S_{diff}$ and the drive signal Sd is between a predetermined range. For example, when the phase difference is between 0-45 degrees, a non-touch is identified; while when the phase difference is between 135-180 degrees, a touch is identified. It is appreciated that a range of said phase difference is not limited to that mentioned herein, and the range is previously measured and set before shipment without particular limitations.

In some embodiments, the capacitive touch device 1 of the present disclosure is used as a touch button simply for detecting whether a touch even occurs without detecting the touch position, e.g., without including the components in FIG. 3 which are not included in FIG. 7.

The switches in the present disclosure are, for example, semiconductor switching devices.

As mentioned above, how to reduce the total power consumption of a capacitive touch device is an important issue. Therefore, the present disclosure provides a capacitive touch device (FIG. 7) that generates a reference signal by disposing an emulation circuit in the control chip. The touch differential detected signal and not-touch differential detected signal obtained by subtracting the reference signal from the detection signal of the touch panel have a 180 degree phase difference which is used to identify a touch event. Meanwhile, the identification of the touch event is mostly accomplished by the analog front end such that the power consumption of the digital back end is reduced.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. A control chip for a capacitive touch device, the control chip configured to be coupled to a touch panel of the capacitive touch device, the touch panel comprising a detection electrode, the control chip comprising:

an amplifying circuit coupled to the detection electrode, and configured to output a first detection signal when the detection electrode does not detect a touch and output a second detection signal when the detection electrode detects the touch;

an emulation circuit, not receiving any signal from the touch panel, and configured to output a reference signal, wherein the emulation circuit comprises a switch, an emulation detection capacitor, an emulation capacitor, an emulation input resistor and an emulation amplifying circuit, and capacitance of the emulation capacitor is smaller than capacitance of the detection electrode of the touch panel, and the switch is configured to connect or disconnect the emulation capacitor to the emulation input resistor corresponding to a self-capacitive mode and a mutual capacitive mode; and a subtraction circuit configured to perform a differential operation between the reference signal and the first detection signal to generate a first differential detected signal, and perform a differential operation between the reference signal and the second detection signal to generate a second differential detected signal, wherein the first differential detected signal and the second differential detected signal are out-of-phase.

2. The control chip as claimed in claim 1, wherein a waveform of the reference signal is between waveforms of the first and second detection signals.

3. The control chip as claimed in claim 1, wherein the emulation circuit comprises a flash and a digital-to-analog converter, and the digital-to-analog converter is configured to generate the reference signal according to digital data stored in the flash.

4. The control chip as claimed in claim 1, further comprising:
a phase reference circuit configured to generate a phase reference signal; and
a detection circuit electrically coupled to the subtraction circuit and the phase reference circuit, and configured to compare phases between the first differential detected signal and the phase reference signal or between the second differential detected signal and the phase reference signal to output a touch signal or a non-touch signal.

5. The control chip as claimed in claim 4, wherein the phase reference circuit comprises a phase lock loop configured to lock a phase of the reference signal outputted by the emulation circuit.

6. The control chip as claimed in claim 4, wherein the phase reference circuit comprises a phase lock loop configured to lock a phase of a drive signal outputted by a drive circuit.

7. A control chip for a capacitive touch device, the control chip configured to be coupled to a touch panel of the capacitive touch device, the touch panel comprising a detection electrode and configured to operate in a self-capacitive mode or a mutual capacitive mode, the control chip comprising:
a detection capacitor configured to be coupled to a signal input of the detection electrode in the self-capacitive mode and not to be coupled to the signal input of the detection electrode in the mutual capacitive mode;
an input resistor coupled to a signal output of the detection electrode;
an amplifying circuit coupled to the input resistor, and configured to output a detection signal;
an emulation circuit comprising an emulation detection capacitor, an emulation self-capacitor, an emulation mutual capacitor, an emulation input resistor and an emulation amplifying circuit, and configured to output a first reference signal in the self-capacitive mode according to the emulation detection capacitor, the emulation self-capacitor, the emulation input resistor and the emulation amplifying circuit, or output a second reference signal in the mutual capacitive mode according to the emulation mutual capacitor, the emulation input resistor and the emulation amplifying circuit; and
a subtraction circuit configured to perform a differential operation between the detection signal and the first reference signal in the self-capacitive mode or perform a differential operation between the detection signal and the second reference signal in the mutual capacitive mode to generate a differential detected signal.

8. The control chip as claimed in claim 7, wherein capacitance of the emulation self-capacitor is 0.92 to 0.98 times of that of a self-capacitor of the detection electrode of the touch panel.

9. The control chip as claimed in claim 7, wherein capacitance of the emulation mutual capacitor is 0.92 to 0.98 times of that of a mutual capacitor of the detection electrode of the touch panel.

10. The control chip as claimed in claim 7, wherein the emulation circuit further comprises switches configured to couple or bypass the emulation detection capacitor, the emulation self-capacitor, the emulation mutual capacitor.

11. The control chip as claimed in claim 7, further comprising:
a phase reference circuit configured to generate a phase reference signal; and
a detection circuit configured to compare phases between the differential detected signal and the phase reference signal to output a touch signal indicating the touch panel being touched or a non-touch signal indicating the touch panel not being touched.

12. The control chip as claimed in claim 11, wherein the phase reference circuit comprises a phase lock loop configured to lock a phase of the first reference signal outputted by the emulation circuit in the self-capacitive mode, or lock a phase of the second reference signal outputted by the emulation circuit in the mutual capacitive mode.

13. The control chip as claimed in claim 11, wherein the phase reference circuit comprises a phase lock loop configured to lock a phase of a drive signal outputted by a drive circuit.

14. A control chip for a capacitive touch device, the control chip configured to be coupled to a touch panel of the capacitive touch device, the touch panel comprising a detection electrode, the control chip comprising:
an input resistor coupled to a signal output of the detection electrode;
an amplifying circuit coupled to the input resistor, and configured to output a detection signal;
a flash configured to previously store at least one digital data;
a digital-to-analog converter configured to output at least one reference signal according to the at least one digital data; and
a subtraction circuit configured to perform a differential operation between the detection signal and the at least one reference signal to generate a differential detected signal, wherein
the at least one digital data comprises a first digital data and a second digital data;
the digital-to-analog converter is configured to output a first reference signal in a self-capacitive mode according to the first digital data and output a second reference signal in a mutual capacitive mode according to the second digital data;
the first digital data is previously obtained and stored in the flash according to a first detection signal outputted by the amplifying circuit in the self-capacitive mode by emulating the touch panel being touched and a second detection signal outputted by the amplifying circuit in the self-capacitive mode by emulating the touch panel not being touched, the first digital data is configured to cause a waveform of the first reference signal to be between waveforms of the first and second detection signals, the second digital data is previously obtained and stored in the flash according to a third detection signal outputted by the amplifying circuit in the mutual capacitive mode by emulating the touch panel being touched and a fourth detection signal outputted by the amplifying circuit in the mutual capacitive mode by emulating the touch panel not being touched, and the second digital data is configured to cause a waveform of the second reference signal to be between waveforms of the third and fourth detection signals.

15. The control chip as claimed in claim 14, further comprising:

a phase reference circuit configured to generate a phase reference signal; and a detection circuit configured to compare phases between the differential detected signal and the phase reference signal to output a touch signal indicating the touch panel being touched or a non-touch signal indicating the touch panel not being touched.

16. The control chip as claimed in claim 15, wherein the phase reference circuit comprises a phase lock loop configured to lock a phase of the first reference signal outputted by the digital-to-analog converter in the self-capacitive mode, or lock a phase of the second reference signal outputted by the digital-to-analog converter in the mutual capacitive mode.

17. The control chip as claimed in claim 15, wherein the phase reference circuit comprises a phase lock loop configured to lock a phase of a drive signal outputted by a drive circuit.

* * * * *